UNITED STATES PATENT OFFICE.

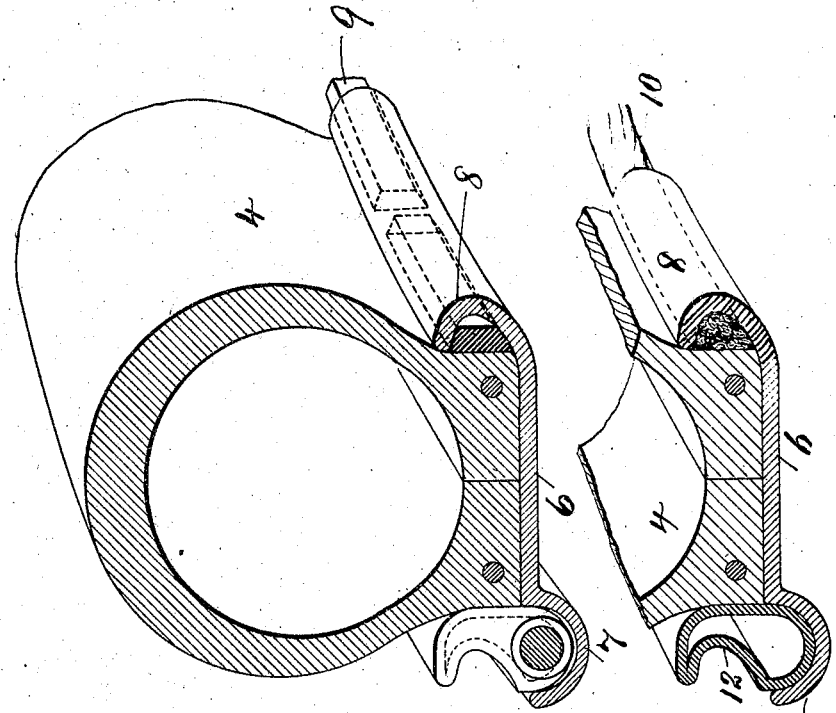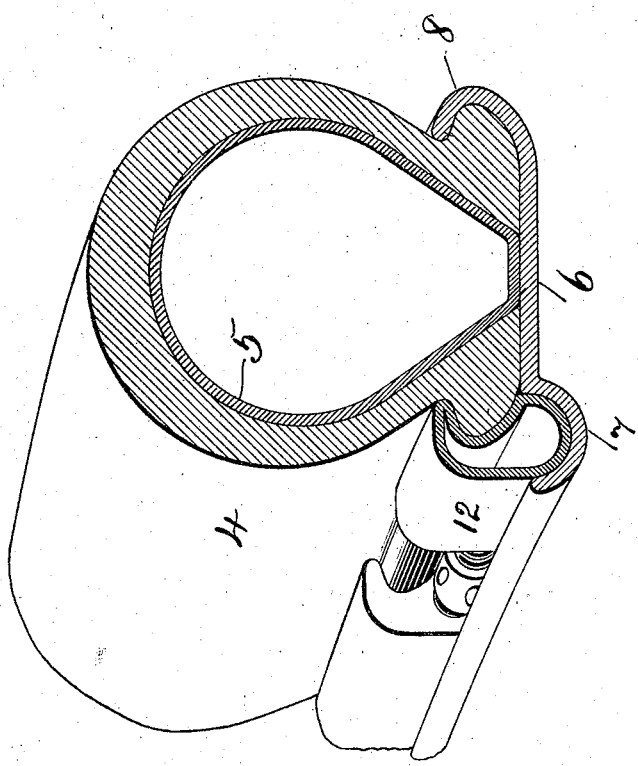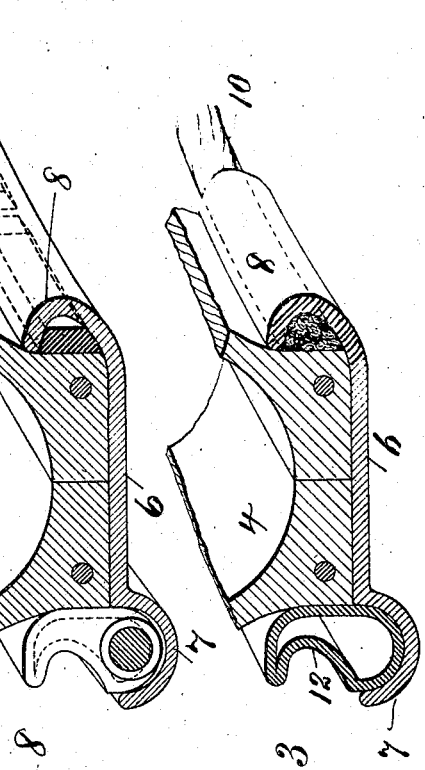

ERNEST HOPKINSON, OF EAST ORANGE, NEW JERSEY.

WHEEL.

No. 893,075.

Specification of Letters Patent.

Patented July 14, 1908.

Application filed October 16, 1906. Serial No. 339,172.

*To all whom it may concern:*

Be it known that I, ERNEST HOPKINSON, a citizen of the United States, residing in the city of East Orange, county of Essex, and State of New Jersey, have invented new and useful Improvements in Wheels, of which the following is a specification.

The present invention relates to wheels and particularly to rims and tires therefor.

The main object of the invention is to provide a rim construction which shall be cheap of manufacture and at the same time be capable of use with various forms of pneumatic tires. In other words, the invention relates to what has become known as a "universal rim".

In the drawings I have illustrated a construction embodying my invention, in which Figure 1 is a view partly in cross-section and partly in perspective showing the invention as applied to a clencher tire. Fig. 2 is a view similar to Fig. 1, but showing the invention as applied to another form of tire. Fig. 3 is a view similar to Fig. 2, but partly broken away and showing a modified form of filler.

In the drawings like letters of reference refer to like parts.

Referring to Fig. 1, 4 designates a tire of the clencher construction and 5 the usual inner tube. The rim is composed of three parts consisting of a flat portion 6, a channel portion 7 adapted to receive a removable flange, and a clencher hook 8. The removable flange 12 is preferably of a construction which has a clencher hook recess on one side while its opposite side is substantially straight. Referring to Fig. 2, 9 designates a filler member which is adapted to close the clencher hook so as to adapt the rim to take a form of tire having a straight side which is illustrated in this figure. In this figure the clencher hook filler is illustrated as consisting of metal and may be in the form of sections or a broken ring, as may be preferable.

In Fig. 3, the filler is shown as consisting of relatively soft material, such as a combination of fiber and rubber.

It will be seen by the present invention there is provided a very simple and cheap construction of rim which is adapted for use in connection with almost any form of tire now on the market.

What is claimed as new is:

1. A wheel rim having a clencher hook at one side, a removable flange on the other side, and a removable filler for the clencher hook having a substantially flat surface on its tire side.

2. A wheel rim having an integral clencher hook on one side, a removable flange on the other side, and a removable filler for the clencher hook having a substantially flat surface on its tire side.

3. A wheel rim having a clencher hook on one side, a reversible and removable flange on the other side and presenting a clencher hook on one face only, and a removable filler for the first named clencher hook.

4. A wheel rim having a clencher hook on one side, a reversible and removable flange on the other side, and a removable filler for the first named clencher hook, said filler comprising a rubber compound and being relatively soft compared with the material of the rim.

In testimony whereof, I have signed my name in the presence of two witnesses.

ERNEST HOPKINSON.

Witnesses:
   H. RICHARD WOBSE,
   K. E. O'BRIEN.